United States Patent [19]

Domer

[11] 3,792,476

[45] Feb. 12, 1974

[54] METHOD AND SYSTEM OF COMMUNICATION BETWEEN SEVERAL GROUND STATIONS AND A TRANSPONDER SATELLITE

[75] Inventor: Josef Dömer, Munich, Germany

[73] Assignee: Siemens Aktiengesellschaft, Berlin & Munich, Germany

[22] Filed: Apr. 20, 1971

[21] Appl. No.: 135,609

[30] Foreign Application Priority Data

Apr. 24, 1970 Germany........................... 2020094

[52] U.S. Cl................................. 343/7.5, 343/5 DP
[51] Int. Cl.............................................. G01s 9/10
[58] Field of Search. 343/7.5, 5 DP, 6.5 LC, 6.8 LC

[56] References Cited

UNITED STATES PATENTS 3,551,813 11/1967 Kaneko............................... 343/7.5

*Primary Examiner*—Stephen C. Bentley
*Attorney, Agent, or Firm*—Herbert L. Lerner

[57] ABSTRACT

A method of communication between several ground stations and a transponder satellite by time-division multiple access (TDMA) operation, which comprises combining the time-multiplexed and preambled signal bursts of the individual ground stations to a transponder time-division pulse frame; regulating in a reference station the real time position of the station burst in the pulse frame relative to the burst datum phase, deriving the regulating criteria from the pulse frame arriving at the reference station by storing the burst datum position in a burst-position memory and comparing the stored datum position with the burst real position in the arriving pulse frame. This results in a phase-error correction signal which is used for correction of the transmitting phase of the burst issuing from the station. More specifically the regulating criteria are obtained by blocking the regulation (in a main regulating circuit) of the burst transmitting phase toward the transmitting side of the reference station and then restoring the regulation (in an auxiliary regulating circuit) through the burst-position memory of the burst datum phase transmitter to derive therefrom an error signal and transferring to a further memory the error data previously stored into the burst position memory (V-RS1) during the course of a regulating operation. This further memory adds the phase error data over a number of consecutive pulse frames to provide an averaged phase error correction signal from the sum of the error data. The memories are preferably of digital binary type.

8 Claims, 6 Drawing Figures

METHOD AND SYSTEM OF COMMUNICATION BETWEEN SEVERAL GROUND STATIONS AND A TRANSPONDER SATELLITE

My invention relates to a method and system for communication between several ground stations through at least one satellite equipped with a transponder. According to this method, the preambled and time-multiplexed signal channels of the individual ground stations are time-staggered and combined in a pulse frame at the satellite side. In the pertinent literature, this method is called TDMA (time-division multiple access).

A transponder satellite travelling on its orbit in synchronism with the earth rotation cannot be considered to be stationary because it continuously performs appreciable movements in all three spacial dimensions relative to the earth. It is therefore necessary, also in steady-state operation, to continuously test the phase position of the preambled signal channels, hereinafter called bursts, at a ground station and, if necessary, to follow-up regulate the burst real position back to its coincidence with the burst datum phase position. As a rule, such regulation is performed by having one of the ground stations constitute a reference station whose issuing burst (reference burst) represents the commencement of the pulse frame to which the bursts of all of the other stations are related as regards their datum phase position. Such a burst sending phase regulation is performed with the aid of supervisory and follow-up regulation circuitry whose regulating criteria are derived from the pulse frame received at the reference station. For the purpose of such derivation the burst datum position is stored in a burst position memory and is compared with the burst real phase position in the pulse frame arriving from the transponder satellite. If the comparison yields a phase error, a correction signal is produced for regulating the sending phase of the reference station burst.

Especially the initial access of a ground station to the transponder-side pulse frame requires a number of identifying data of the pulse frame which must be determined by measuring this pulse frame. The faultless determination of these data requires a relatively great amount of equipment especially if the communicating operation is to be performed at very high bit sequence frequencies in the order of 100 Mbit/sec.

It is an object of my invention to improve ground-to-satellite communication on the TDMA principle described above, so as to perform the pulse frame measuring operation at the ground station with a minimum of additional circuitry, and to afford a virtually error-free derivation of the required identifying data required for controlling the regulation.

Another related object of the invention is to minimize or virtually obviate faulty regulation as may be due by errors which may occur within an individual pulse-frame measurement but are substantially negligible if a longer sequence of such measurements is taken into account.

Still another object of my invention is to simplify the necessary circuitry and increase their reliability by affording a digital performance of the regulating system.

To achieve these objects and in accordance with the feature of my invention, the regulation, i. e., the regulating circuit, for the burst sending phase regulation at the reference ground station is continually blocked towards the transponder satellite and thereafter is opened, i. e., the regulating circuit is re-closed through the burst position memory of the burst datum phase transmitter. In other words, the measurement is first made in a main circuit extending from the reference ground station to the transponder satellite and back to the ground station, and is then repeated in an auxiliary circuit extending only within the ground station itself. In the course of such a regulating performance the critical control value for the regulation is stored in the burst-position memory and is subsequently shifted into another memory which may comprise several memory units. The error signal is derived from the latter memory and applied to the follow-up control of the burst real phase to make it coincident with the datum phase.

The invention is predicated upon the recognition that the regulating circuit for the burst sending phase regulation, which is designed for a slight error probability, can also be used in a simple and advantageous manner for measuring the pulse frame, namely by having the regulating circuit which normally is closed over the transponder satellite, modified when needed to become an auxiliary regulating circuit which is limited to the ground station. By utilization such an auxiliary regulating circuit, the required identifying data, for example the beginning and end of a pulse frame gap suitable for initial access or the phase position of an initial access time marker in the pulse frame represented by the time spacing between the beginning of the pulse frame and the identifying datum value, can be stored into the burst position memory in terms of a multiple of the channel width duration of a burst and thence be restored into further memories. Since the storing of pulse-frame identifying data occurs in the rhythm of the pulse frame frequency, each time in discrete phase steps corresponding to channel width, the error probability of the identifying data ascertained is correspondingly slight.

A further considerable improvement with respect to occurring errors and the burst sending phase regulation as well as the pulse frame measuring performance, is attained by having the regulating circuit for the burst sending phase regulation extending over the satellite as well as the auxiliary regulating circuit limited to the ground station alone, first operate to add up any phase errors over a number of pulse frames and to subsequently furnish the correction signal as a result of the averaged sum of phase errors.

Particularly favorable operating and circuit requirements are achieved by performing the regulation digitally in steps corresponding to the time spacing of a channel width (burst duration).

In a preferred system for performing the method, the regulating circuit for the burst sending phase regulation and the auxiliary regulating circuit comprise a burst datum phase transmitter, a phase discriminator which determines any phase error between the burst datum phase position and the burst real phase position, as well as a phase correction memory which converts the phase error into correction signals and is equipped at its output with an electric switching device. In such a system the error correction signals at the memory output can be selectively supplied through the switching device to the burst datum phase transmitter for adjusting it (in the auxiliary regulating circuit) or instead to the burst sending phase transmitter for adjusting the latter.

According to a further feature relating to the system equipment just described, an error-detection circuit is preferably provided within the connection of the first discriminator and the phase correction memory, the error-detector circuit having the effect of averaging the phase error over a number of pulse frames.

For averaging the detected phase error over a number of $2n$ pulse frames, it is preferable and results in a particularly simple system design, to provide a binary counter with $1 + 2n$ counting steps to which counter the phase errors are supplied in the form of counting pulses. The start position of the binary counter for an average count is predetermined, so that the phase error averaged from the sum of $2n$ individual phase errors appears in coded form at the respective outputs of the counter stages $1 + n$ to $1 + 2n$; simultaneously the error direction signal can be derived from the switching position of the stage $1 + 2n$.

Preferably the burst datum phase transmitter consists substantially of a channel counter controlled in dependence upon the beginning of an arriving pulse frame, a forward-reverse counter (burst-position memory) controllable by the error correction signals at the output of the phase correction memory, and a comparator which is connected between two counters and whose output is connected with one input of a phase discriminator. The step outputs of the forward-reverse counter are preferably connected through controllable coupling circuits with two or more of the memories that serve to re-store the data.

The above-mentioned objects, advantages and features of my invention, said features being set forth in the claims annexed hereto, will be apparent from and will be mentioned in the following description of a communication system according to the invention illustrated by way of example on the accompanying drawings in which:

Figure 1:
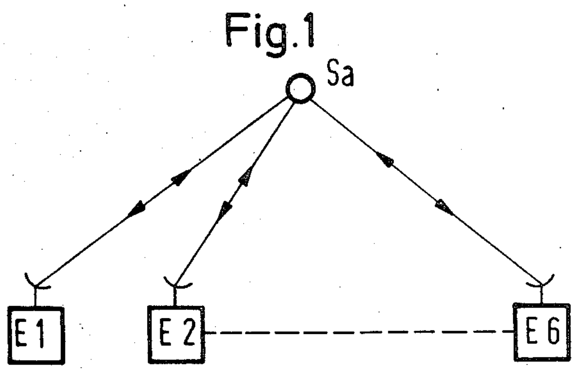
FIG. 1 is a diagram of a ground-station and transponder-satellite communication network.

In FIG. 1 the transponder satellite Sa cooperates with a number of ground stations exemplified schematically at El, E2 . . . E6. The satellite travels in synchronism with the earth rotation and is equipped with relay devices operating as a transponder. The ground stations E1 to E6 are all linked to each other through the satellite Sa. When in operation each ground station issues a burst to the satellite in the rhythm of the pulse-frame frequency, this burst being composed of a preamble followed by signal channels. Within a pule-frame period, the individual ground stations E1 to E6 transmit their respective bursts in time intervals separated from each other by protective time spaces to make certain that all bursts transmitted from the ground stations to the satellite on the same carrier wave will not overlap in time.

Figure 2:
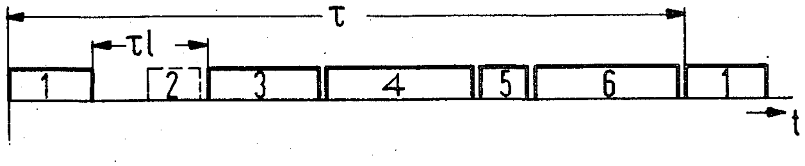
FIG. 2 is an explanatory graph showing schematically the pulse frame constituted by the sequential bursts of the individual ground stations.

In the coordinate diagram of FIG. 2 such a pulse-time frame, having the period $\tau$, is represented versus time $t$. The ground station E1 constitutes the so-called reference station in this particular communication system. The burst 1 of station 1 constitutes the beginning of the pulse frame. The other bursts two to six of the respective ground stations E2 to E6 occupy the rest of the pulse frame in such a manner that a frame gap may remain after the burst 1. In the pulse frame schematically presented in FIG. 2, a broken line indicates that the ground station E2 is disconnected and that any initial access of this station 2 to the pulse frame must be carried out in such a manner that the burst 2 will be situated in the time gap between the reference burst 1 and the burst 3 of ground station E3, this gap having the size $\tau 1$; and the back flank of burst 2 must have the prescribed time spacing from burst 3 of the next station E3.

As mentioned in the steady-state of system operation, it is merely necessary to compare at the ground stations the burst real phase position with the burst datum position and, if necessary, to apply the burst sending phase regulation in order to shift the real phase back to the datum phase. For initial access of a station it is first necessary for the ground station to ascertain the required identifying data (criteria) of the pulse frame; that is the pulse frame received at that ground station from the transponder satellite must first be measured. For this purpose the frame starting time marker of the reference station 1 is used as a measuring reference.

Figure 3:
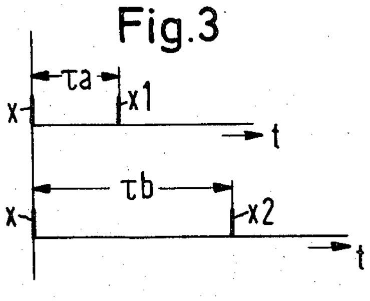
FIGS. 3 and 4 represent the time markers needed for proper initial access of the ground stations, relative to the pulse frame according to FIG. 2.

If, as shown in FIG. 3, the time spacing $\tau a$ between the frame-starting time marker $x$ and the gap-starting time marker $x1$ at the ground station E2 which is to perform the initial access are known, and if the time spacing $\tau b$ which is shown between the frame starting time marker $x$ and the time marker $x2$ indicative of the gap end are also known, then by logical interconnection of these two memorized (stored-off) magnitudes a yes-no statement can be obtained with respect to the applicability of the initial access. This is because if the gap of the width $\tau 1$ is not sufficient for the burst of the first-access of station E2, the access cannot be carried out. The gap-starting time marker $x1$ can be gained with the aid of a relatively simple discriminator circuit which responds to the first carrier-wave disconnection occurring after the appearance of the frame start time marker $x$, whereas the first regular occurring correlation peak subsequent to the frame-starting time marker $x$ indicates the gap end and hence the starting moment for access of the next following station. This correlation peak is derived from the identifying word in the preamble of a burst, namely according to FIG. 2 from the preamble word of the burst 3. When the ground station E2, intending to get access to the transponder satellite, has recognized the gap of the pulse frame according to FIG. 2 to be sufficiently wide, then it is necessary to fix the burst datum phase position relative to the pulse frame according to FIG. 2. For this purpose, the ground station E2 issues an initial access time marker $x4$ which is gained from a PN sequence which is keyed with a burst starting signal and upon which the useful signal is superimposed. The time marker $x3$ indicative of the burst datum phase position can be determined with the aid of the memorized (stored-off) time marker $x2$ indicative of the gap end, under consideration of the fixedly predetermined protective time spacing and the burst length of the burst 2 on the ground station.

Figure 4:
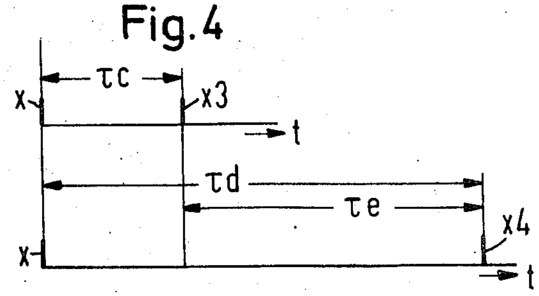

This time marker $x4$ is represented in FIG. 4. The marker is again determined as the time spacing $\tau c$ between the frame-start time marker $x$ and the time marker $x3$ which indicates the datum phase position of the burst 2. Further shown in FIG. 4 is the initial access time marker $x4$ which is determined by its time-spacing $\tau d$ from the frame $\tau d$ start time marker $x$.

By comparing the initial access marker $x4$ with the marker $x3$, both being stored in respective memories, the necessary shifting of the burst sending phase by the time-spacing $\tau e$ according to FIG. 4 can be derived prior to issuing the burst. This is preferably done in such a manner that the memory into which the initial access time marker is entered is constituted by a digital counter whose counting stage, with the simultaneous shifting of the burst starting phase, is varied until the content of the counter coincides with the content of the memory for the burst datum phase position.

Figure 5:
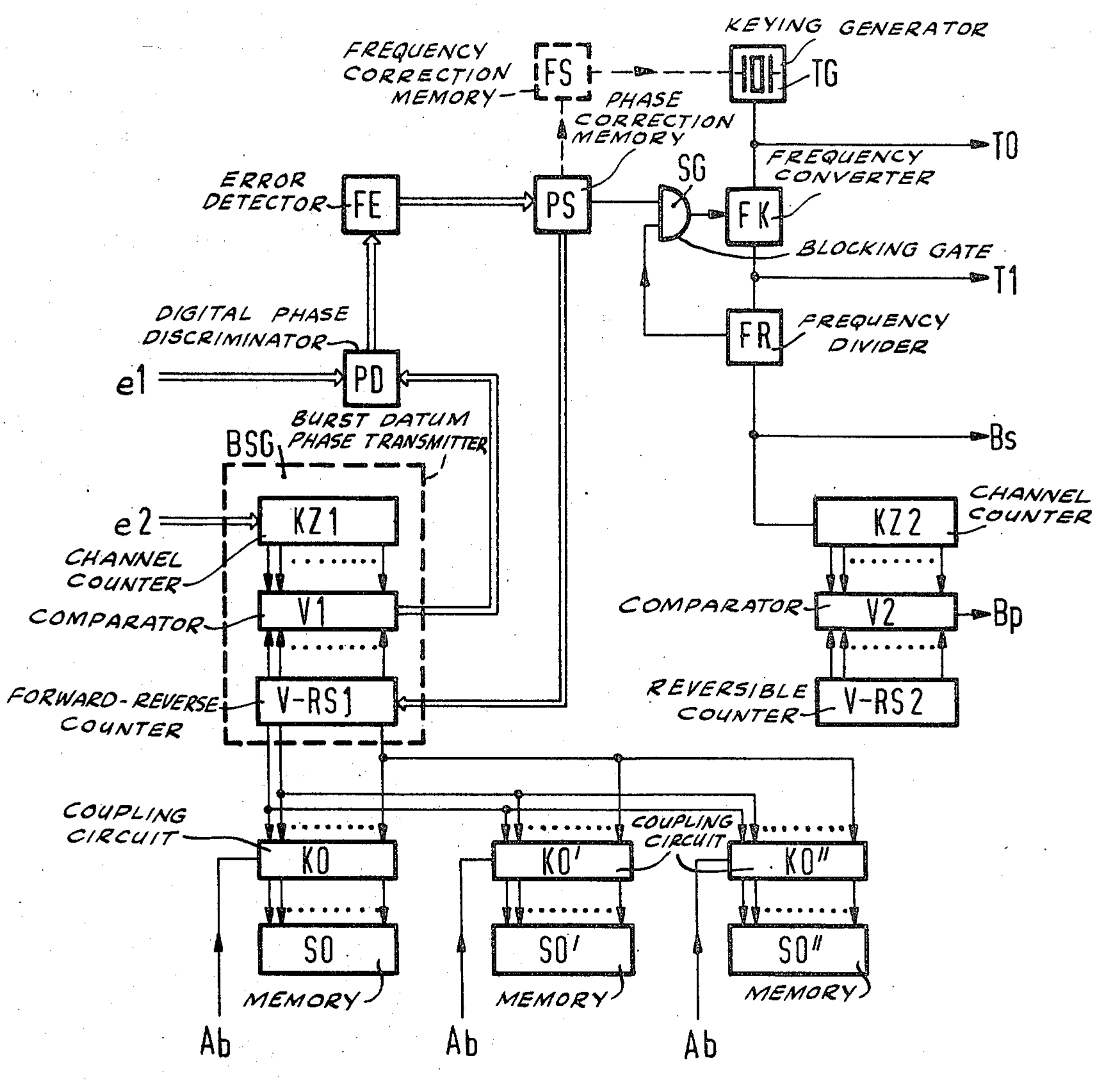
FIG. 5 is block-type circuit diagram of a system for the selective burst sending phase regulation and pulse frame measuring operation according to the invention.

In the embodiment of the system illustrated in FIG. 5, the burst datum phase transmitter BSG comprises a channel counter KZ1, forward-reverse counter V-RS1, and a comparator VI which compares the counting states of the two counters. The channel counter KZ1 is started by each pulse arriving at the input $e2$ and marking the pulse frame starting moment. The reversible counter V-RS1 represents the burst position memory for the burst sending phase regulation and memorizes the burst datum phase. Each time the channel counter KZ1, controlled in the rhythm of a channel tact, reaches the counting position of the reversible counter V-RS1, it issues a pulse to the preferably digital phase discriminator PD. Another input $e1$ of the same phase discriminator receives a signal indicating the phase position of the burst produced in the particular ground station within the arriving pulse frame. The phase discriminator compares the burst real phase with the burst datum phase and, in the event of non-coincidence, issues an error signal to an error detecting device FE. The error detector FE adds up the incoming phase errors over a relatively large number of pulse frames, performs an averaging operation and issues the averaged phase error to the phase correction memory PS. The error detector FE has the purpose to prevent that a false individual measuring operation will cause an improper correction, especially during the burst transmitting phase regulation.

The burst sending phase transmitter is controlled merely during the burst transmitting phase regulation through the phase correction memory, in the sense of shifting of the burst real phase back to the burst datum phase. The burst sending phase transmitter comprises a keying (clock-pulse) generator TG whose pulse sequence frequency is chosen to be equal to the bit frequency of the system. The bit tact of the keying generator TG is supplied through the output To to further groups of components appertaining to the transmitting and receiving equipment of the ground station, and simultaneously to the input of a frequency converter FK which subdivides the bit tact to the channel tact and whose division ratio can be controlled in order to perform the desired burst sending phase regulation. The channel tact is taken from the output T1 and supplied to the input of another frequency divider FR which reduces the channel tact to the frame tact. The frame tact serves to start the channel counter KZ2 and provides at the output Bs a starting pulse for the burst of its own station.

A channel counter KZ2, like the channel counter KZ1 of the burst datum phase transmitter BST, cooperates through a comparator V2 with the reversible counter V-RS2, which memorizes the burst length of the station. In this manner, by comparing the counter states, the station burst stop signal is gained and becomes available at the output Bp of the comparator V2. As will further be seen from FIG. 5, the output of the phase correction memory PS is connected through a blocking gate SG with the input of the frequency divider FK. The blocking input of gate SG is connected with one output of a frequency divider FR. It is made certain in this manner that the burst sending phase displacement is carried out in time intervals of sequential pulse frames. Preferably the control of the frequency divider FK, which subdivides the bit tact down to the channel tact in response to the error signal furnished by the output of the phase correction memory, is so rated that it changes the burst transmitting phase with each pulse frame by the width of a bit.

When according to the invention the above-described regulating circuit for the burst transmitting phase regulation is also used for measuring the burst signal frame, care is to be taken by an internal switching device of the phase correction memory PS that, on the one hand, no error correction signals will affect the burst sending phase transmitter and that, on the other hand, the occurring error correction signals are employed for adjusting the reversible counter V-RS1 of the burst datum phase transmitter BSG. In the auxiliary regulating circuit gained in this manner, the channel counter KZ1 is started at the input by the frame starting time marker in the same manner as previously during the operation of the main regulating circuit. However, the input E1 of the phase discriminator PD now receives the signals that are required for the identifying data to be determined, for example such signals as are indicative of the gap beginning, gap end, starting of the stations own burst, initial access time marker and the like. In the course of the regulation, the reversible counter V-RS1 is varied until the signal appearing at the output of the comparator V1 coincides in time with the signal arriving at the input $e1$ of the phase discriminator. Then the time spacing of the signal at input $e1$ at the starting of the pulse frame is stored in the reversing counter V-RS1. The stored magnitude can then be stored off through one of the three coupling circuits KO, KO′ and KO″ into respective memories SO, SO′ and SO″. For this purpose the storage transfer signal in the form of an opening pulse of short duration is supplied through the input Ab to the particular coupling circuit. As soon as the magnitude is stored away in this manner, the auxiliary regulating circuit can again be applied for determining further characteristic data of the pulse frame.

As indicated in FIG. 5 by a broken line, the phase correction memory PS may be connected through the frequency correction memory FS with the keying generator TG. In this manner an additional frequency regulation of the keying generator is afforded, such a regulation being useful when the phase error exceeds a desired limit.

Figure 6:
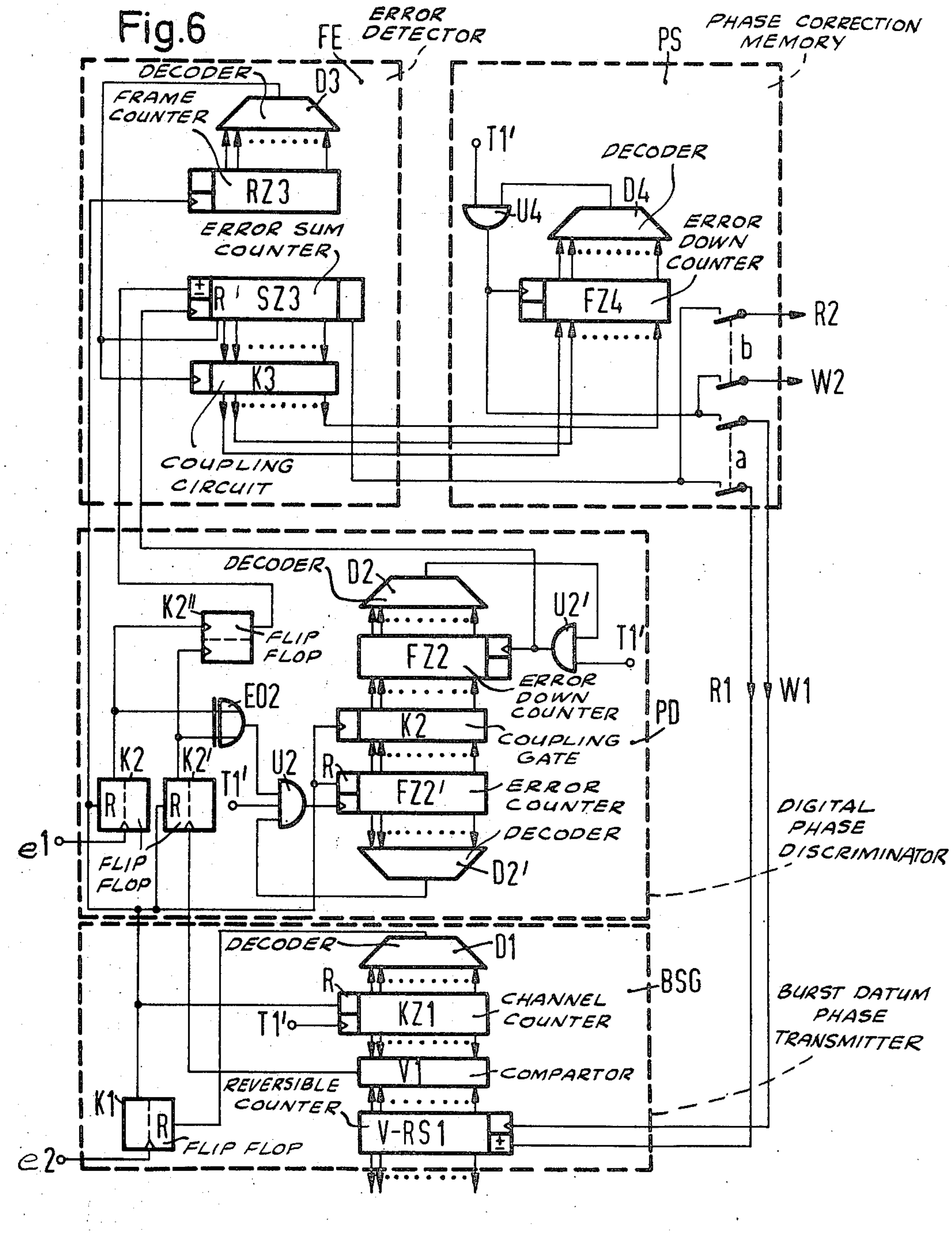
FIG. 6 is a more detailed circuit diagram of the system components essential for the pulse-frame measuring performance in a communication system according to FIG. 5.

As mentioned, it is preferable for achieving a high reliability of operation, to design the regulating circuit for the burst sending phase regulation as well as the auxiliary regulating circuit for pulse frame measurement, on digital principles. The embodiment illustrated in FIG. 6 relates to such a circuitry for the auxiliary regulating circuit. The individual subassemblies, namely the burst datum phase transmitter BSG, the phase discriminator PD, the error detection circuit FE and the phase correction memory PS are individually identified by broken-line blocks representing respective modules or module groups.

As soon as the frame starting time marker arrives at the input $e2$ of the burst datum phase transmitter BSG, a flip-flop K1 releases the re-setting input R of the channel counter KZ1 and also the re-setting inputs R of the flip-flop stages K2 and K2′ of the error counter FZ2′ of the phase discriminator PD. As a result the channel counter KZ1, whose control input receives the channel tact T1′, commences to run. As soon as it has reached the counting position of the reversible counter V-RS1, the comparator V1 issues a pulse to the excitation input of the flip-flop K2′ by which this flip-flop is triggered to its other state. In the same manner the flip-flop K2 of the phase discriminator PD is switched when its input $e1$ receives a pulse which identifies the given real-phase value in the arriving pulse frame. Different logic levels at the outputs of the flip-flops K2 and K2′ cause through an exclusive OR-gate E02 the release of the error counter FZ2′. The counting tact for the error counter FZ2′ is the channel tact T1′ which is also applied to the channel counter KZ1. In this manner the time spacing between the appearance of the switching pulse at the inputs of the flip-flop stages K2 and K2′ is measured and is then available in digital form at the outputs of the error counter FZ2′. The decoder D2′ which follows the output of the error counter FZ2′ has its output connected with one of the three inputs of the AND-gate U2. This decoder-gate combination provides for self-blocking of the error counter FZ2′ which becomes effective when the error counter has reached its end position.

At the end of the measuring period, the error magnitude determined is transferred through the coupling gate K2 into the error down counter FZ2 whereafter the error counter FZ2′ is reset to Zero. The re-setting comes about by virtue of the fact that the outputs of the channel counter KZ1 of the burst datum phase transmitter BSG are connected with a decoder D1 whose output is connected to the re-setting input R of the flip-flop K1. As soon as the channel counter KZ1 has reached its end position given by the length of the pulse frame, the decoder D1 responds and performs the re-setting operation. This simultaneously resets the channel counter KZ1, the flip-flop stages K2 and K2′, and the error counter FZ2′. The error down counter FZ2 of the phase discriminator PD is so designed that it will start from the given counting position, to which it has been adjusted by the phase error stored in coded form by the error counter FZ2′, and will automatically count back to the null count in the rhythm of the channel tact supplied to its input through the AND-gate U2′. The counter FZ′, when arriving at the null position, will block itself. The self-blocking takes place through a decoder D2 which is connected to the stage outputs of the counter FZ2, the output of the decoder D2 being connected with one of the two inputs of an AND-gate U2′. The number of the count-down pulses indicate by how many phase steps of channel width in the operation "burst sender phase regulation" the burst sending phase must be shifted, and by many steps in the operation "pulse frame measuring" the reversible counter V-RS1 must be shifted. The direction in which the shift is to take place is determined with the aid of the flip-flop stage K2″ of the phase discriminator PD. The flip-flop stage K2″ has two inputs of which one is connected with the exclusive OR-gate E02. The switching state of this flip-flop K2″, at the end of a measuring period, depends upon which of the two flip-flops K2 and K2′ has last been switched in the course of a pulse frame period.

The output of the AND-gate U2′ of the phase discriminator PD is connected with the value input, and the output of the flip-flop K2″ is connected with the direction input of the error sum counter SZ3 of the error detector device FE. The phase error, determined by the phase discriminator PD is added up by the counter SZ3 as to magnitude and direction over a relatively large number of pulse frames. The adding operation is supervised with the aid of the frame counter RZ3 whose input receives the re-setting pulses for the flip-flops K2 and K2′ as well as for the error counter FZ2′ of the phase discriminator PD. When the frame counter RZ3 has reached its end position, the decoder D3 which follows the step outputs of the counter RZ3 issues a pulse to the coupling circuitry K3 connected to the outputs of the error sum counter SZ3. This pulse also occurs simultaneously at the re-setting input R of the sum error counter SZ3 and re-sets this counter with time delay. The coupling circuitry K3 responds to a given large number of pulse frames added up in the error sum counter SZ3 and issues to the error down counter FZ4 of the phase correction member BS a signal representative of the average error in coded form.

The error sum counter SZ3 is a binary counter with $1 + 2n$ stages which, at the beginning of a summing operation, is set by its re-setting input R to its middle counting position. The frame counter RZ3 together with its decoder D3 is rated for counting a total of $2n$ frames. As mentioned this dimensioning affords taking the phase error off in coded form at the respective counter-step outputs of stages $1 + n$ and $1 + 2n$. Simultaneously, the counting step $1 + 2n$ furnishes the required statement concerning the counting direction. Together with the setting of the error down counter FZ4, the decoder D4 connected with the outputs of the counter FZ4 excites through its output the AND-gate U4 so that the pulses of the tact T1′ can become effective at the input of the error down counter FZ4. As soon as the counter FZ4 reaches its null position, the supply of the tact T1′ through the AND-gate U4 is blocked. The output of the AND-gate U4 constitutes the value output for the correction signal at one of the two value outputs W1 and W2 of the phase correction memory. The direction of the ascertained phase error is indicated by the signal at one or the other of the two direction outputs R1 and R2 of the phase correction memory. As explained, this phase error is furnished from the last stage $1 + 2n$ of the error sum counter SZ3 in the error detecting device FE.

For selectively connecting the output of the phase correction memory on the one hand to the burst sending phase transmitter for performing an operation "burst sending phase regulation," and on the other hand for performing the operation "pulse frame measuring," the phase correction memory PS comprises a switching device composed of two switching members

*a* and *b*. When the switch *a* is closed, the value output W1 and the direction output R1 for reversible counter V-RS1 of the burst datum phase transmitter BSG is switched through to the AND-gate U4, or instead to the sum error counter SZ3. A corresponding switching-through of the connections attached to the outputs of the burst sending phase transmitter, namely the magnitude output W1 and the direction output R1, is effected when the switch *b* closes.

For achieving a high resolution of the phase error to be determined, as is desired particularly for the burst sending phase regulation, the bit-tact To' can be applied instead of the channel tact T1' for the error counter SZ2' and the error down counter SZ2. An analogous change is applicable with respect to the tact of the error down counter FZ4. In this case care must be taken that only each *m*-th pulse, arriving at the reversing counter V-RS1 when switch *a* is closed, will shift this counter; *m* being the number of bits appertaining to one channel.

The components and modules illustrated on the drawings in block fashion are known as such and commercially available as individual modules or module groups, for example in the form of, or including, integrated circuits with solid-state components. As regards details of a transponder satellite, reference may be had, for example, to the paper "Communications Satellites" in Siemens Review, Vol. 38, (1971) No. 2, pages 51 to 57.

To those skilled in the art it will be obvious upon a study of this disclosure that my invention permits of many variations and may be given embodiments other than described and illustrated herein, without departing from the essential features of my invention and within the scope of the claims annexed hereto.

I claim:

1. In the method of communication between several ground stations and a transponder satellite by time-division multiple access (TDMA) operation, which comprises combining the time-multiplexed and preambled signal bursts of the individual ground stations to a transponder time-division pulse frame; regulating the real time position of a ground-station burst in the pulse frame relative to the burst datum phase and deriving the regulating criteria from the pulse frame arriving from the satellite at said ground station by storing the burst datum position in a burst position memory and comparing the stored datum position with the burst real position in the arriving pulse frame to obtain a phase-error correction signal, and correcting in response to said signal the transmitting phase of the burst issuing from said station; the improvement which comprises determining said regulating criteria by blocking said regulation of said burst transmitting phase toward the transmitting side of said ground station and restoring said regulation through the burst-position memory of the burst datum phase transmitter to derive therefrom the control magnitude for effecting said regulation; and transferring to another memory the regulating phase-error data previously stored into the burst position memory (V-RS1) during the course of a regulating operation.

2. The method of claim 1, which comprises adding in said other memory the phase error data over a number of consecutive pulse frames, and deriving said phase error correction signal from the averaged sum of said error data.

3. The method of claim 2, which comprises effecting the phase regulation in digital steps corresponding to a channel width.

4. In a system of communication between several ground stations and a transponder satellite by time-division multiple access (TDMA) wherein the signal bursts of the individual ground stations are combined in a time-division pulse frame, at least one of said stations comprising means for regulating the real time position of a ground-station burst in the pulse frame arriving from the satellite so as to maintain a burst datum phase, said regulating means comprising burst transmitter means, a burst-position datum memory for storing the burst datum phase position, means for receiving pulse frames from the satellite, a phase discriminator connected to said datum memory and said receiving means for issuing an error signal upon departure of the real time position of the ground station burst from the burst datum phase stored in said datum memory; the improvement which comprises a main regulating circuit linking said ground station with said transponder satellite for burst phase regulation of said transmitter means, said main circuit including said burst transmitter and said receiving means, an auxiliary regulating circuit limited to said ground station and comprising said burst position memory, selective switching means connected with said two circuits for successively opening said main circuit and closing said auxiliary circuit for deriving said error signal and storing it in said burst position memory, and an integrating memory connected to said burst position memory for re-storing and summing said signals over a number of pulse frames, whereby a correction signal is issued for correcting the phase of said ground station burst in accordance with an average error of said number of pulse frames.

5. In a system of communication between several ground stations and a transponder satellite by time-division multiple access (TDMA) wherein the signal bursts of the individual ground stations are combined in a time-division pulse frame, at least one of said stations comprising means for regulating the real time position of a ground-station burst in the pulse frame arriving from the satellite so as to maintain a burst datum phase, said regulating means comprising burst transmitter means, a burst-position datum memory for storing the burst datum phase position, means for receiving pulse frames from the satellite, a phase discriminator connected to said datum memory and said receiving means for issuing an error signal upon departure of the real time position of the ground station burst from the burst datum phase stored in said datum memory; the improvement which comprises a main regulating circuit linking said ground station with said satellite, an auxiliary regulating circuit limited to said ground station, said two circuits comprising said burst datum phase memory (BSG), said phase discriminator (PD) for detecting a phase error between the burst datum phase position and the burst real position, as well as a phase-error correction memory (PS); and selective switching means connected between the output of said correction memory and said two circuits for selectively supplying the error correction signals to said burst datum phase transmitter for adjusting it in said auxiliary circuit or to said burst sending phase transmitter for adjusting it in said main circuit.

6. a System according to claim 5, comprising error averaging means (FE) connected between said phase discriminator (PD) and said phase-error correction memory (PS) for averaging the phase errors over a number of consecutive pulse frames.

7. In a system according to claim 6, said error averaging means (FE) comprising, for averaging phase errors over $2n$ pulse frames, a reversible binary counter (SZ3) with $1+2n$ counting stages which receives the phase error signals in the form of counting pulse sequences, the start position of said binary counter being set for a middle counting step, the median phase error corresponding to the sum of the $2n$ phase errors being available in coded form at the outputs of the respective counter stage $1+n$ to $1+2n$, and circuit means for deriving the error direction from the switching position of said switching means at the counting stage $1+2n$.

8. In a system according to claim 7, said burst phase datum transmitter (BSG) comprising a channel counter (K21) controlled in dependence upon the beginning of an arriving pulse frame, a reversible counter (V-RS1) connected to said phase correction memory (PS) to be controlled by the error correction signals appearing at the output of said latter memory, and a comparator (V1) interconnecting said two counters and having an output connected with an input of said phase discriminator (PD), at least two re-storing memories (SO, SO', SO''), and controllable coupling circuits (KO, KO', KO'') connecting the stage outputs of said reversible counter with said latter memories.

* * * * *